(12) United States Patent
Bisdikian et al.

(10) Patent No.: US 9,882,994 B2
(45) Date of Patent: *Jan. 30, 2018

(54) PROVIDING A SENSOR COMPOSITE SERVICE BASED ON OPERATIONAL AND SPATIAL CONSTRAINTS

(71) Applicant: International Business Machines Corporation, Armonk, NY (US)

(72) Inventors: Chatschik Bisdikian, Chappaqua, NY (US); Christopher R. Gibson, Southampton (GB); Dominic P. Harries, Winchester (GB); Syed Y. Shah, Troy, NY (US); Petros Zerfos, New York, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/593,519

(22) Filed: May 12, 2017

(65) Prior Publication Data

US 2017/0302746 A1 Oct. 19, 2017

Related U.S. Application Data

(63) Continuation of application No. 14/135,911, filed on Dec. 20, 2013, now Pat. No. 9,654,570.

(51) Int. Cl.
*G06F 15/177* (2006.01)
*H04L 29/08* (2006.01)
*H04W 4/02* (2009.01)

(52) U.S. Cl.
CPC .......... *H04L 67/16* (2013.01); *H04L 67/2838* (2013.01); *H04W 4/02* (2013.01); *H04L 67/12* (2013.01)

(58) Field of Classification Search
CPC ..... H04L 67/16; H04L 67/12; H04L 67/2838; H04W 4/02
(Continued)

(56) References Cited

U.S. PATENT DOCUMENTS 7,346,597 B2 3/2008 Dumas
7,475,060 B2 1/2009 Toyama et al.
(Continued)

FOREIGN PATENT DOCUMENTS

WO WO 03/067816 A1 8/2003
WO WO2007/115366 A1 10/2007
(Continued)

OTHER PUBLICATIONS

U.S. Appl. No. 13/029,156.
(Continued)

*Primary Examiner* — Michael Y Won
(74) *Attorney, Agent, or Firm* — Stephen J. Walder, Jr.; Rabin Bhattacharya

(57) ABSTRACT

Mechanisms are provided for generating a composite service. A request to generate the composite service is received that identifies a geospatial region of interest for the composite service. One or more types of components needed to generate the composite service are determined and, for each component of a plurality of components of the one or more types of components, a corresponding spatial coverage characteristic is determined. A subset of components, from the plurality of components, is selected based on the spatial coverage characteristics of the plurality of components and the geospatial region of interest. The composite service is then generated based on the selected subset of components from the plurality of components.

20 Claims, 6 Drawing Sheets

(58) Field of Classification Search
USPC .................................. 709/201, 223, 230, 246
See application file for complete search history.

(56) References Cited

U.S. PATENT DOCUMENTS

| | | | |
|---|---|---|---|
| 7,801,842 | B2 | 9/2010 | Dalton |
| 8,589,389 | B2 | 11/2013 | Bisdikian et al. |
| 9,641,684 | B1* | 5/2017 | Hibbard ............... H04M 3/523 |
| 2007/0124496 | A1 | 5/2007 | Laarnanen et al. |
| 2007/0135992 | A1 | 6/2007 | Riise et al. |
| 2007/0216771 | A1 | 9/2007 | Kumar |
| 2007/0282746 | A1* | 12/2007 | Anke .................... G06F 9/5044 705/51 |
| 2007/0300296 | A1 | 12/2007 | Kudla et al. |
| 2008/0050286 | A1 | 2/2008 | Elliott et al. |
| 2008/0104030 | A1 | 5/2008 | Choi et al. |
| 2008/0148339 | A1 | 6/2008 | Hill et al. |
| 2008/0177688 | A1 | 7/2008 | Friedlander et al. |
| 2008/0183389 | A1 | 7/2008 | Chainer et al. |
| 2008/0209026 | A1 | 8/2008 | Qi et al. |
| 2009/0150475 | A1 | 6/2009 | Cebis et al. |
| 2010/0027426 | A1 | 2/2010 | Nair et al. |
| 2010/0083270 | A1 | 4/2010 | Kline |
| 2010/0228602 | A1 | 9/2010 | Gilvar et al. |
| 2010/0255830 | A1 | 10/2010 | Manolescu et al. |
| 2010/0302373 | A1 | 12/2010 | Monsive, Jr. |
| 2011/0119523 | A1 | 5/2011 | Bisdikian et al. |
| 2012/0197852 | A1 | 8/2012 | Datta Debojyoti et al. |
| 2012/0197898 | A1 | 8/2012 | Pandey et al. |
| 2012/0197911 | A1 | 8/2012 | Banka et al. |
| 2012/0215893 | A1 | 8/2012 | Bisdikian et al. |
| 2012/0244795 | A1 | 9/2012 | Heerdink et al. |
| 2012/0246261 | A1 | 9/2012 | Roh et al. |
| 2012/0287854 | A1 | 11/2012 | Xie et al. |
| 2013/0096831 | A1 | 4/2013 | Chan et al. |
| 2013/0150089 | A1 | 6/2013 | Kuwahara et al. |
| 2013/0151135 | A1 | 6/2013 | Aubrey et al. |
| 2013/0194928 | A1 | 8/2013 | Iqbal |
| 2013/0285855 | A1 | 10/2013 | Dupray et al. |
| 2014/0003195 | A1 | 1/2014 | Vonog et al. |
| 2014/0009562 | A1 | 1/2014 | Hegde et al. |
| 2014/0020007 | A1 | 1/2014 | Mears et al. |
| 2014/0115128 | A1 | 4/2014 | Myrberg et al. |
| 2014/0250489 | A1* | 9/2014 | Calo .................... H04L 63/20 726/1 |
| 2014/0372561 | A1 | 12/2014 | Hisano |
| 2015/0081798 | A1* | 3/2015 | Lee .................... H04L 67/2809 709/205 |
| 2015/0180986 | A1 | 6/2015 | Bisdikian et al. |
| 2015/0363563 | A1* | 12/2015 | Hallwachs ........... G06F 19/3406 705/3 |

FOREIGN PATENT DOCUMENTS

| | | |
|---|---|---|
| WO | WO 2007/144568 A1 | 12/2007 |
| WO | WO 2009/067063 A1 | 5/2009 |

OTHER PUBLICATIONS

U.S. Appl. No. 14/135,911.
Barnaghi, Payam et al., "Semantic Sensor Network XG Final Report", W3C Incubator Group Report, Jun. 28, 2011, 80 pages.
Bisdikian, Chatschik et al., "A Letter Soup for the Quality of Information in Sensor Networks", IEEE Information Quality and Quality of Service (IQ2S'09) Workshop (in IEEE PerCom'09), Galveston, TX, USA, Mar. 2009, pp. 468-473.
Bisdikian, Chatschik et al., "Building Principles for a Quality of Information Specification for Sensor Information", 12th Intl Conf. on Information Fusion (FUSION'09), Seattle. WA, USA, Jul. 2009, 8 pages.
Braumandl, Reinhard, "Quality of Service and Optimization in Data Integration Systems", Final Doctoral Dissertation/Exam, Dept of Mathematics & Informatics, University of Passau, Feb. 28, 2002, pp. 503-512.
Burke, J. et al., "Participatory Sensing", World Sensor Web Workshop (in ACM Sensys'06), Boulder, CO, USA, Oct. 31, 2006, 5 pages.
Butkiewicz, Thomas et al, "Multi-Focused Geospatial Analysis Using Probes", Posted online Oct. 27, 2008, 6 pages.
Devillers, Rodolphe et al., "Multidimensional Management of Geospatal Data Quality Information for its Dynamic Use Within GIS", Photogrammetric Engineering & Remote Sensing, vol. 71, No. 2, Feb. 2005, pp. 205-215.
Dilmaghani, Raheleh et al., "Policy-aware Service Composition in Sensor Networks", Proc. 9th International Conference on Service Computing, SCC2012, Honolulu, HI, Jun. 24-29, 2012, 8 pages.
Geyik, Sahin C. et al., "Robust Dynamic Service Composition in Sensor Networks", IEEE Transactions on Services Computing, 2012, 15 pages.
Gummadi, Ravi et al., "SMARTINT: A System for Answering Queries over Web Databases Using Attribute Dependencies", Data Engineering(ICDE) 2010 IEEE Conf., Mar. 2010, pp. 1149-1152.
Hershberger, John et al., "Summarizing Spatial Data Streams Using ClusterHulls", 8th Wksp on Algorithm Engineering and Experiments (ALENEX'06), Miami, FL, USA, Jan. 2006, 15 pages.
Huang, W.H, et al., "Topological Map Merging", The Int'l J. of Robotics Research, vol. 24, No. 8, Aug. 2005, pp. 601-613.
Jureta, Ivan J. et al., "A Comprehensive Quality Model for Service-Oriented Systems", Software Quality Control Journal, vol. 17, Issue 1, Kluwer Academic Publishers, Mar. 2009, pp. 1-29.
Krishnamachari, Bhaskar et al., "Analysis of Energy-Efficient, Fair Routing in Wireless Sensor Networks through Non-linear Optimization", In Vehicular Technology Conference, 2003. VTC 2003—Fall. 2003 IEEE 58th, vol. 5, pp. 2844-2848. IEEE, 2003.
Lacher, Martin S. et al., "A Framework for Personalizable Community Web Portals", Proceedings of Human-Computer Interaction International, 2001, 5 pages.
Lee, Ryong et al., "Layer-based Media Integration for Mobile Mixed-Reality Applications", Third International Conference on Next Generation Mobile Applications, Services and Technologies, IEEE/INSPEC, 2009, pp. 58-63.
Liu, C.H. et al., "QoI-Aware Wireless Sensor Network Management for Dynamic Multi-Task Operations", IEEE SECON'10, Boston, MA, USA, Jun. 2010, 9 pages.
Mao, Jie et al., "Event-based Constraints for Sensornet Programming", DEBS '08, Jul. 1-4, 2008, Rome, Italy, pp. 103-113.
Maue, Patrick et al., "Data Integration in the Geospatial Semantic Web", Journal of Cases on Information Technology, 11(4), 100-122, Oct.-Dec. 2009, INSPEC, pp. 100-122.
O'Rourke, Joseph et al., "A New Linear Algorithm for Intersecting Convex Polygons", Computer Graphics and Image Processing 19, 1982, pp. 384-391.
Pelekis, Nikos et al., "Literature Review of Spatio-Temporal Database Models", The Knowledge Engineering Review, vol. 19, No. 3, Sep. 2004, pp, 34 pages.
Rajagopalan, Ramesh, "Spatial Correlation Based Sensor Selection Schemes for Probabilistic Area Coverage", International Journal of Computer Networks & Communications (IJCNC) vol. 3, No. 2, Mar. 2011, pp. 233-249.
Schwiderski-Grosche, Scarlet et al., "The SpaTeC Composite Event Language for Spatio-Temporal Reasoning in Mobile Systems", DEBS'09, Jul. 6-9, 2009, pp. 1-12.
Selen, Yngve et al., "Sensor Selection for Cooperative Spectrum Sensing", 3rd IEEE Symposium on New Frontiers in Dynamic Spectrum Access Networks, DySPAN 2008, 2008, 11 pages.
Slawski, Bill, "Yahoo Patent Filings on Indexing and Advertising Using Geographic Boundaries", SEO by the Sea, http://www.seobythesea.com/?p=684, Jun. 17, 2007, 8 pages.
Srivatsa, Mudhakar et al., "A Metadata Calculus for Secure Information Sharing", 16th ACM Conferenceon Computer and Communications Security (CCS'09), Chicago, IL, USA, Nov. 2009, 12 pages.
Stvilia, Besiki et al., "A Framework for Information Quality Assessment", Journal of the American Society for Information Science and Technology, 58(12): 1720-1733, 2007.

(56) References Cited

OTHER PUBLICATIONS

Tran, Khoi-Nguyen et al., "Short Paper: Semantic Sensor Composition", In Proceedings of the 2nd International Workshop on Semantic Sensor Networks (SSN09) at ISWC 2009, 16 pages.
Tychogirogos, George et al., "Selecting Relevant Sensor Providers for Meeting "Your" Quality Information Needs", 12th IEEE International Conference on Mobile Data Management, Jun. 2011, pp. 200-205.
Xue, Wenwei et al., "Contour Map Matching for Event Detection in Sensor Networks", ACM SIGMOD Int'l Conf. on Management of Data (SIGMOD'06), Chicago, IL, USA, Jun. 2006, pp. 145-156.

* cited by examiner

PROVIDING A SENSOR COMPOSITE SERVICE BASED ON OPERATIONAL AND SPATIAL CONSTRAINTS

This application is a continuation of application Ser. No. 14/135,911, filed Dec. 20, 2013, status awaiting publication.

GOVERNMENT RIGHTS

This invention was made with Government support under Contract No.: W911NF-06-3-0001 awarded by Army Research Office. The Government has certain rights in this invention.

BACKGROUND

The present application relates generally to an improved data processing apparatus and method and more specifically to mechanisms for providing a sensor composite service based on operational and spatial constraints.

In today's society, environmental sensors are increasingly being used to monitor geospatial conditions. For example, traffic cameras and other traffic sensors are used to monitor roadway conditions, weather sensors are used to monitor weather conditions at various geographical locations, cameras are used for facial recognition to identify persons of interest, sensors for monitoring city operations, utility grids, supply chains, surveillance, and the like, and other cameras and sensors are used to monitor a plethora of other geospatial conditions. These cameras and sensors generate a large amount of time-varying geospatial data. The proliferation of such cameras, sensors, and the like, and the resulting large datasets gathered from these spatially-distributed camera and sensor devices provides unprecedented opportunities for increased situation awareness and effective action-taking by end-user smart applications.

These cameras and sensors (hereafter referred to collectively as "sensors") are often associated with a plurality of different providers that each may monitor different geospatial regions and may measure different characteristics of a particular geospatial region, e.g., acoustic properties, temperature properties, barometric pressure properties, visual properties, etc. Thus a single geospatial data provider and/or type of sensor may not be able to fulfill the information needs to perform advance analysis and utilization of data.

SUMMARY

In one illustrative embodiment, a method, in a data processing system comprising a processor and a memory, for generating a composite service is provided. The method comprises receiving, by the data processing system, a request to generate the composite service, wherein the request identifies a geospatial region of interest for the composite service. The method further comprises determining one or more types of components needed to generate the composite service and determining, for each component of a plurality of components of the one or more types of components, a corresponding spatial coverage characteristic. The method also comprises selecting, by the data processing system, a subset of components from the plurality of components based on the spatial coverage characteristics of the plurality of components and the geospatial region of interest. In addition, the method comprises selecting a subset of components from the plurality of components based on the spatial relevancy measures of the plurality of components.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions, which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
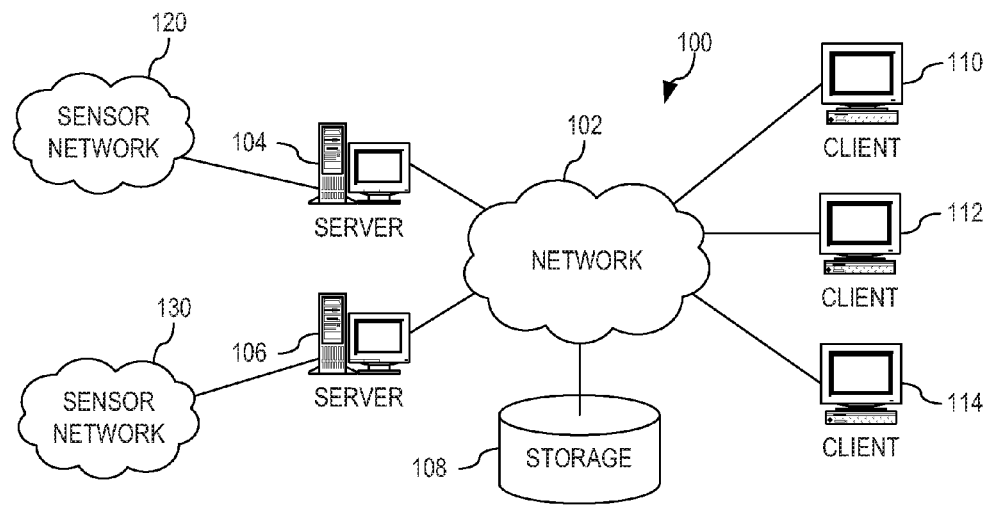
FIG. 1 is an example diagram of a distributed data processing system in accordance with one illustrative embodiment.

The illustrative embodiments provide mechanisms for providing a sensor composite service based on operational and spatial constraints. The present invention is based on the recognition that a sensor service may be defined as a composition of a plurality of sensors of the same or different types, provided by the same or different provider entities, and directed to monitoring characteristics (or properties) of a same or different geospatial region. The information obtained from various different sensors may be combined to provide a more comprehensive representation of the characteristics of a particular geospatial region of interest, which may then be analyzed to provide a sensor composite service to users.

Within the context of the present description, a sensor composite service is defined as a combination of functionality residing on multiple sensor nodes and/or associated sensor services to provide a complex service. An example of a sensor composite service may be a camera tracking service which may make use of one or more acoustic sensors to detect and event occurring and using the detection of the event (e.g., car accident), possibly using a triangulation service, to cause one or more cameras (e.g., traffic cameras) to focus on a geospatial area (e.g., intersection of roads) to capture images of the event, using a camera service. It should be understood that the sensors, or sensor platforms, themselves may implement both pure sensory-related functionality (e.g., acoustic sensing) as well as algorithmic functionality that may, or may not, be directly related to sensing. For example, a triangulation algorithmic functionality operates on acoustic measurements, but is not in itself a sensing capability. Thus, the sensors, or sensor platforms, referenced in the present description may encompass one or both pure sensors (typically acting as initial data inputs/measurement sources) as well as algorithmic functionality that may be necessary as part of a sensor composite service.

The use of sensors and/or primitive sensor services in a sensor composite service may be constrained by security policies that specify allowed information flows among sensor nodes. Moreover, the use of particular sensors in a sensor composite service may also be constrained based on system or network management policies that control the use of these sensors based on available resources. In U.S. Patent Application Publication No. 2012/0215893, which is hereby incorporated by reference, a mechanism was provided for generating efficient data flow graphs by minimizing various cost-based metrics, i.e. performing cost minimization.

The present invention, in addition to providing cost efficiency though cost minimization, addresses the issue of how one can make the processing of selected sensors and/or primitive sensor services for a desired sensor composite service geographically relevant. That is, a user may be interested in a particular geospatial region (where "geospatial" refers to a geographical and/or spatial location, area, region, or the like) and wishes to have a sensor composite service provided that provides the desired sensor information and analysis results for the geospatial region of interest. The geospatial region may be defined in terms of various types of metrics including latitude/longitude coordinates, Cartesian coordinates, or any other multi-dimensional representation of space. The illustrative embodiments of the present invention, described herein, provide a mechanism for minimizing cost and ensuring that the geospatial region of interest to the user is covered by the sensor composite service requested by the user, while providing a desired quality of information (QoI).

With the mechanisms of the illustrative embodiments, each sensor and/or primitive sensor service (where a "primitive" sensor service is a service that may be combined with other services and/or sensors to generate a sensor composite service) is assigned a spatial relevancy metric with respect to the spatial interest of a provided user request for a sensor composite service. Service selection during sensor composite service creation takes into account both the cost of selecting the component sensor(s) and/or primitive sensor services (referred to hereafter as "components") as well as the spatial relevancy of these components.

In order to provide a spatial relevancy metric for components (sensor(s) and/or primitive sensor service(s)), a spatial coverage characteristic is generated for the component. Some components have a spatial coverage characteristic associated with them directly, e.g., a camera sensor may have an associated geospatial location and radius or arc of viewing associated with the camera sensor that defines the geospatial range from which the camera is able to capture images. Thus, the geospatial location combined with the range or arc defines a geospatial area or region that the camera covers, i.e. a spatial coverage characteristic.

Other components may not have a directly associated spatial coverage characteristic. In such a case, the present invention generates a spatial coverage characteristic from the spatial coverage characteristics of the sub-components of the component. For example, a sensor triangulation service may not natively incorporate a notion of a spatial coverage characteristic, but may inherit the spatial coverage characteristics of the sensors from which the sensor triangulation service obtains inputs. As another example, a panoramic image composer service may not natively incorporate the notion of a spatial coverage characteristic, but inherits the spatial coverage characteristic of the camera sensors that provide the panoramic image composer service input.

Thus, with the mechanisms of the illustrative embodiments, each component (sensor and/or primitive sensor service) either natively provides a spatial coverage characteristic or is assigned a spatial coverage characteristic based on a function of the spatial coverage characteristics associated with that component's sub-components. The spatial coverage characteristic of a component may be compared against the geospatial requirements submitted by a user in a user request for a sensor composite service. Results of the comparison may be used to generate a spatial relevancy measure for the component which, in turn, can be used to determine which components should be included in the sensor composite service. That is, by selecting those components whose spatial coverage characteristic more closely match the requested geospatial requirements, and thus, have a higher spatial relevancy measure, a desired sensor composite service may be constructed. Such selection may be based on the spatial coverage characteristics as well as other factors including types of the components, costs associated with inclusion of the component in the sensor composite service, data flow constraints (which may be reflected as a "cost"), quality of information (QoI), and the like. As a result, a sensor composite service is dynamically generated that meets the specific requirements requested by the user, based on the various components available and both their geospatial characteristics and costs (which may represent various types of costs including data flow constraints, QoI, and the like).

For example, consider the case where a city agency needs to monitor traffic accidents occurring within a geographical area of a city. In order to monitor such traffic accidents, the city wishes to utilize cameras to obtain video images of such traffic accidents when they occur. The city government, or third party providers, may already have cameras used to monitor red light violations, traffic congestion, or other conditions of various areas of the city, which may be repurposed to assist in the monitoring of traffic accidents. Similarly, the city government, or third party providers, may further have acoustic sensors deployed, or may deploy such acoustic sensors, for the purpose of monitoring acoustic characteristics of various areas of the city. As a result, in order to provide the traffic accident monitoring, the city officials may wish to enlist a sensor composite service that leverages the functionality of the sensors and/or primitive sensor services associated with the deployed sensors to perform a more complex functionality and/or analysis. In the present example, the sensor composite service may make use of the acoustic sensors to sense acoustic input for designated areas of the city, provide output to a triangulation service that triangulates the location of an event based on the sensed acoustic input, and then provides an output to a camera sensor service that may control the operation of one or more cameras to direct their operation to the detected location of an event.

The above hypothetical (albeit not improbable) scenario exemplifies a trend where increased deployment and use of sensor networks is ushering a new era where information rich solutions are becoming even more pervasive and integrated parts of our personal and professional lives. The mechanisms of the illustrative embodiments establish procedures by which one can leverage the pervasiveness of sensors and primitive sensor services in today's society to provide complex sensor composite services that can provide desired information about geospatial areas of interest. More specifically, the mechanisms of the illustrative embodiments provide logic for selecting components from which a sensor composite service may be generated and provided to a user, with the selection being based on cost and geospatial factors.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
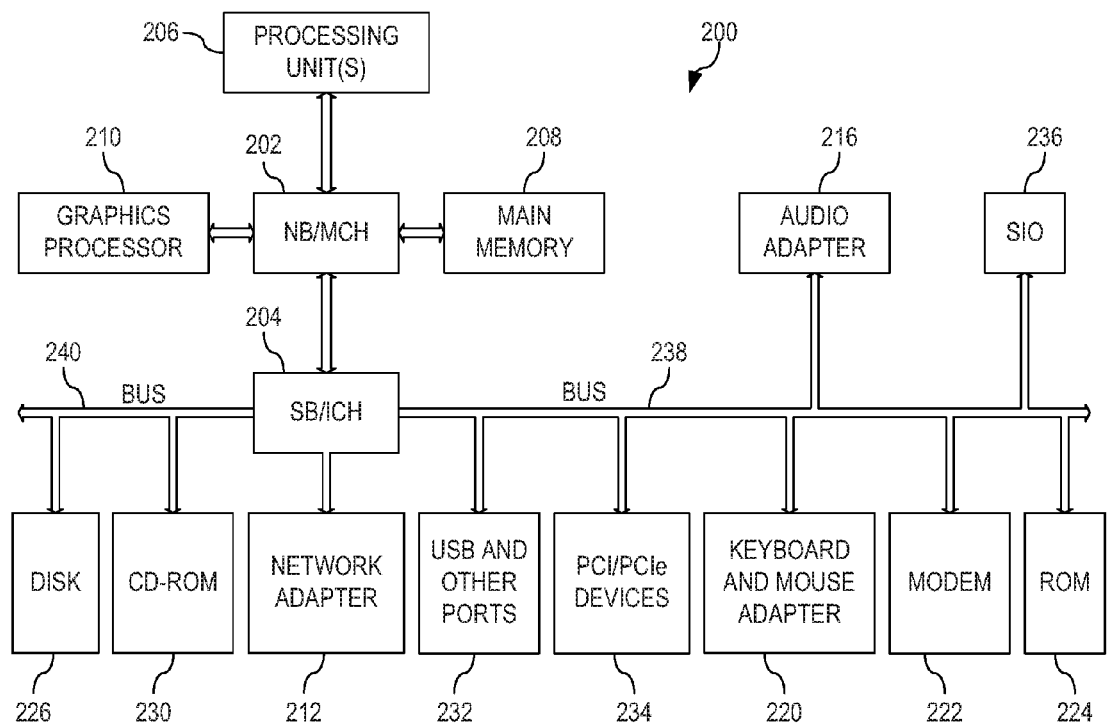
FIG. 2 is an example block diagram of a data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As illustrated in FIG. 1, the servers 104 and 106 may be coupled to one or more sensor networks 120-130 which may be comprised of a plurality of electronic sensor devices and primitive sensor services of the same or different types (e.g., cameras, acoustic sensors, temperature sensors, pressure sensors, motion sensors, infrared sensors, triangulation services, composition services, control services, etc.) which are able to relay data corresponding to sensed conditions and perform primitive analysis or functionality with regard to a geospatial region via one or more data networks to the servers 104 and 106. This data may be made available, through the servers 104 and 106 and network 102, to one or more other servers (not shown), or even client devices 110-114, for use with sensor composite services in performing relatively complex analysis of the sensor data provided by the sensor networks 120-130. These sensor composite services may be statically generated or dynamically generated in response to user requests. Furthermore, the servers 104, 106, client devices 110-114, or the like, may provide primitive sensor services which may also be included in the generation or defining of such sensor composite services, e.g., triangulation services, panoramic composer services, or the like. As described in greater detail hereafter, the servers 104, 106, or other servers not shown, and/or client devices 110-114 may implement mechanisms in accordance with the illustrative embodiments to dynamically select components (e.g., sensors and/or primitive sensor services) to utilize with these sensor composite services in accordance with determined spatial relevance characteristics and costs.

With reference now to FIG. 2, a block diagram of an example data processing system is shown in which aspects of the illustrative embodiments may be implemented. Data processing system 200 is an example of a computer, such as client 110 or server computer 106 in FIG. 1, in which computer usable code or instructions implementing the processes for illustrative embodiments of the present invention may be located. The data processing system 200 may be configured, via hardware, software, or a combination of hardware and software, to implement logic for performing the various operations and functions described hereafter with regard to providing a sensor composite service based on operational and spatial constraints as well as spatial coverage characteristics of potential components of the sensor composite service.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As mentioned above, the illustrative embodiments provide mechanisms for creating sensor composite services by selecting components (sensors and/or primitive sensor services) for inclusion in the sensor composite service and then generating resources to define and control the sensor composite service. The sensor composite service is a collection of different sensors and/or primitive sensor services that together provide a complex functionality for achieving a desired operation. For example, a sensor composite service may be a camera tracking service that utilizes various components including acoustic sensors, cameras, triangulation services, and camera control systems to perform event tracking, e.g., traffic accident detection and monitoring.

The data structures and functional associations of these sensors and/or primitive sensor services provide a "description" of the sensor composite service. This description of the sensor composite service includes the specification of the interconnections of the selected components with one another. Such specification of interconnectivity amongst the selected component sensors/services may, for example, include a specification of the interconnection requirements between an output port of a first component (that acts as a service provider or sensor data provider), among a plurality of output ports of the first component, with an input port of a second component (that acts as a service or sensor data consumer) among a plurality of input ports of the second component. Such specification of interconnectivity amongst selected components might also include metadata information relating to the data transferred from one component to another via connectivity of input-output ports, the metadata information specifying characteristics of the data, such as quality measures (for example fidelity), provenance information (e.g., sources used for the generation of the data), as well as any other type of information that may characterize the data. The description of the sensor composite service may include information that characterize the composite service itself, including, but not limited to, overall cost of the sensor composite service, spatial coverage that the sensor composite service provides, and the like. Once the description of the sensor composite service is available, it can be used by the sensor network administrator and/or platform to instantiate the sensor composite service, including, but not limited to, loading the selected component services in memory and executing them, configuring network connectivity among the sensors so as to be able to transfer data among the sensors and sensor services that run on them, as well as other operational and security parameters that might need to be configured for the uninterrupted execution, communication and operation of the component sensors/services, and the like. In addition, the description of the sensor composite service may be stored in a sensor composite service repository for later retrieval, reference, to be used itself as a primitive sensor service component for synthesizing higher-layer sensor composite services, shared with third parties, audited, used to trigger dynamic re-composition should any of the operational parameters change, or the like.

Figure 3:
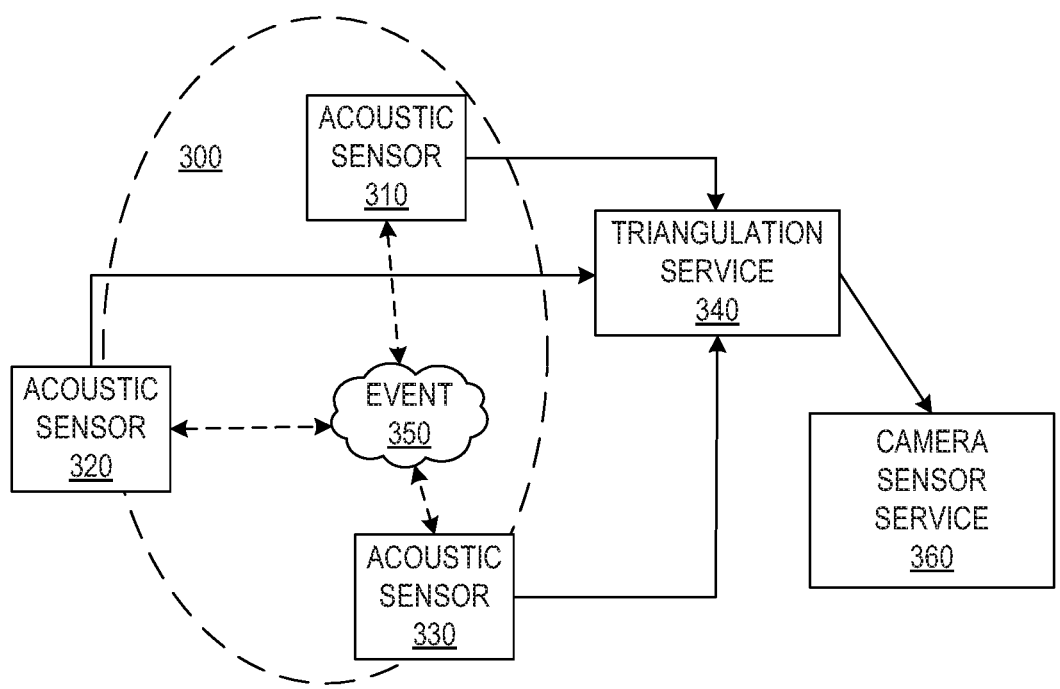
FIG. 3 is an example diagram illustrating the components of a sensor composite service in accordance with one illustrative embodiment.

FIG. 3 is an example diagram illustrating the components of a sensor composite service in accordance with one illustrative embodiment. As shown in FIG. 3, a sensor composite service is depicted that, in this case, is a camera tracking service. The camera tracking service requires geo-location of an event of interest which can be obtained through the triangulation of acoustic bearings. That is, by using at least three acoustic sensors 310-330, monitoring a geospatial location 300 and feeding acoustic data representing the acoustic conditions detected in the geospatial location 300 to a triangulation service 340, the location of an event 350 within the geospatial location 300 may be determined. The use of such acoustic sensors and triangulation services in themselves is generally known in the art and thus, a more detailed description of how events are detected based on acoustic data and the geo-location determined through triangulation is not provided herein.

Such event detection and geo-location may be combined with a camera sensor service 360 to control the operation of one or more camera sensors to direct their operation to the geo-location for the event 350 as determined by the triangulation service 340. That is, the acoustic sensors 310-330 may comprise logic for determining that an event of interest, e.g., a traffic accident, has occurred by analyzing the acoustic input received by the acoustic sensors 310-330. Alternatively, the acoustic sensors 310-330 may strictly collect acoustic input and provide corresponding acoustic data to another service (not shown) that determines whether particular events have occurred within the geospatial location 300 by analyzing the acoustic data. Such a service may even be integrated with the triangulation service 340, for example.

Having detected that an event has occurred, the triangulation service 340 may analyze the acoustic data to determine a geo-location for the detected event. For example, strength of acoustic signals may be triangulated by the triangulation service 340 to identify the most likely geo-location of the detected event. This geo-location data may be transmitted to the camera sensor service 360 which may then control one or more camera sensors to train their viewing area on the determined geo-location so that camera image/video data may be collected. Further complex analysis of the camera images/video may be performed by the camera sensor service 360, or other services (not shown), to perform complex functionality for handling detected events, e.g., dispatching emergency services, generating reports and/or alerts, contacting appropriate personnel, etc.

The collection of the components including the acoustic sensors 310-330, the triangulation service 340, and the camera sensor service 360 in this example, constitutes an instance of a sensor composite service which, in this case, is a camera tracking service. It should be appreciated that there may be various sensor networks deployed in various geo-spatial locations and may be provided by a number of different providers. Similarly, various primitive sensor services may be provided for performing various types of analysis of data obtained from sensor networks. Thus, the selection of sensors within a sensor network, or across multiple sensor networks, as well as primitive sensor services may be a complex process especially when trying to satisfy requirements in user requests for such sensor composite services. Sensors and primitive sensor services must be selected that provide the necessary data for performing the more complex functionality/analysis while taking into account the costs of including the sensor/primitive sensor services in the sensor composite service and also making sure that the selected sensors/primitive sensor services have a spatial coverage characteristic that covers at least a portion of the geospatial region of interest.

Figure 4:
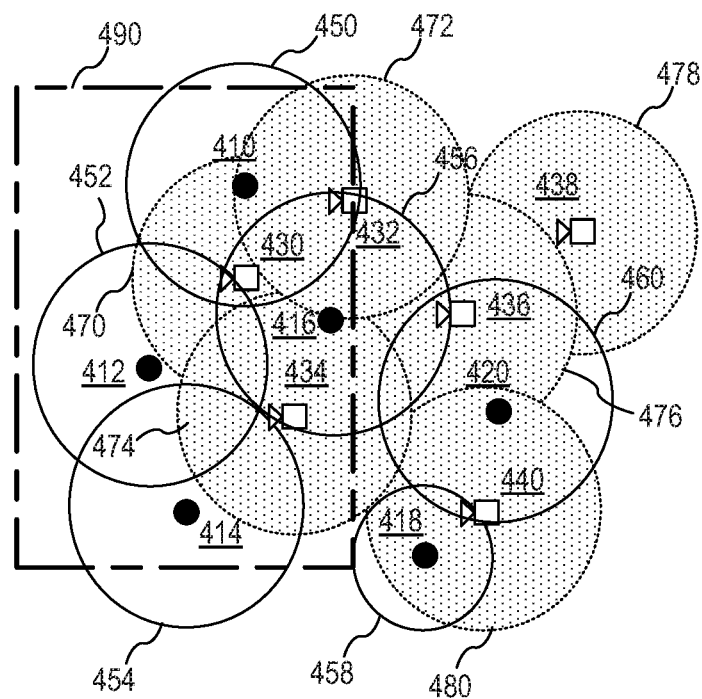
FIG. 4 is an example diagram illustrating a selection of components for inclusion in a sensor composite service in accordance with one illustrative embodiment.

FIG. 4 is an example diagram illustrating a selection of components for inclusion in a sensor composite service in accordance with one illustrative embodiment. As shown in FIG. 4, for a particular geographical region, a plurality of sensors may be provided by one or more providers, with the sensors being of the same or different types. For example, multiple acoustic sensors 410-420 and multiple camera sensors 430-440 may be provided within the geographical region 400. Each of the sensors may have a corresponding spatial coverage characteristic representing a portion 450-460 and 470-480 of the geographical region 400 that the sensor is able to monitor, i.e. obtain sensor input. A user may wish to establish a sensor composite service, such as a camera tracking service, for a particular geospatial region 490. A subset of each of the types of sensors 410-420 and 430-440 have spatial coverage characteristics 450-460 and 470-480 that fall within the geospatial region 490. Thus, these subsets of sensors 410-420 and 430-440 should be considered as candidates for inclusion within the requested sensor composite service. Moreover, from these candidates individual sensors may be selected based on costs, quality of information, type of sensor, and other pertinent factors, that will be apparent to those of ordinary skill in the art in view of the present description, which differentiate one sensor or group of sensors from another of the same or different type.

Thus, in the depicted example, sensors 410-416 and 430-434 have spatial coverage characteristics 450-456 and 470-474 that fall within the geospatial region 490. Sensors 418-420 and 436-440 have spatial coverage characteristics 458-460 and 476-480 that fall outside of the geospatial region 490 of interest. From the sensors 410-416 and 430-434 subsets of the sensors may be selected based on a degree of coverage of the spatial coverage characteristics with regard to the geospatial region 490, the number and types of sensors needed for other selected primitive sensor services, and the like. For example, assuming that a triangulation service is going to be used as part of the sensor composite service, then at least three acoustic sensors may be selected from the subset of acoustic sensors 410-416 that provide a best coverage of the geospatial region 490. Similarly, camera sensors from within the subset of camera sensors 430-434 that provide a greatest coverage of the geospatial region 490.

FIG. 4 illustrates the selection of sensors based on natively associated spatial coverage characteristics associated with the sensors. However, as mentioned above, some sensors and/or primitive sensor services may not have natively associated spatial coverage characteristics. For example, in the example previously mentioned above, the triangulation service and camera tracking service themselves may not have a natively associated spatial coverage characteristic. Thus, a spatial coverage characteristic may be generated for these services based on the spatial coverage characteristics of the sub-components, e.g., sensors or sub-component services, associated with the service. Therefore, for example, the spatial coverage characteristic of the triangulation service may be generated based on the native spatial coverage characteristics of the sensors selected to provide input to the triangulation service, and the spatial coverage characteristic of the camera tracking service may be generated based on the spatial coverage characteristic of the triangulation service. Thus, a component (sensor or primitive sensor service) that does not have a native spatial coverage characteristic inherits the spatial coverage characteristic through an aggregation function applied over the spatial coverage characteristics of its input components.

Figure 5:
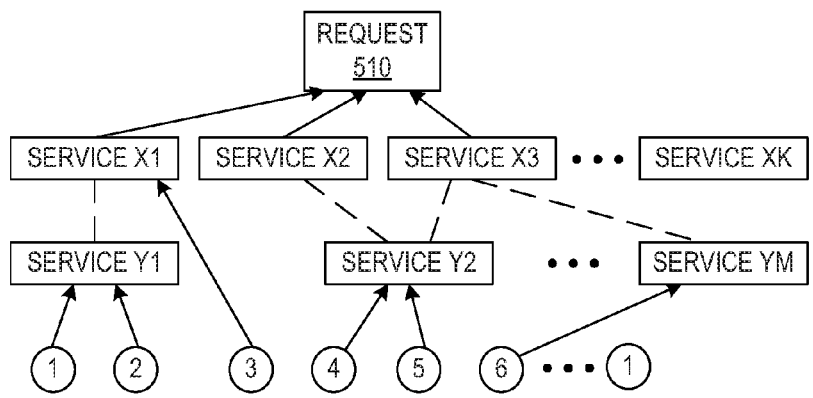
FIG. 5 is an example diagram illustrating a hierarchy of components for illustrating spatial coverage characteristic generation for components in accordance with one illustrative embodiment.

FIG. 5 is an example diagram illustrating a hierarchy of components for illustrating spatial coverage characteristic generation for components in accordance with one illustrative embodiment. As shown in FIG. 5, a user may request a particular sensor composite service that the user wishes to generate with a given geospatial region of interest 510. That is, the user, via a user interface or the like, may submit a request to generate a sensor composite service. The request may specify the type of sensor composite service that is to be generated, the types of components needed to generate the sensor composite service, or the like, a geospatial region of interest for the sensor composite service, and may optionally specify other parameters for generating the sensor composite service, including a maximum cost, a quality of information desired, or the like. In some illustrative embodiments, the user may not need to specify the components to make up the sensor composite service and instead may allow an automated engine, as described hereafter, determine what components are needed to provide the requested sensor composite service. In such a case, the sensor composite service may be a pre-determined type of sensor composite service recognized by the engine and may in fact be selected by a user from a predetermined list of available sensor composite services. In other illustrative embodiments, the user may specify the sensor composite service by specifying desired outputs along with spatial and/or operational parameters without necessarily selecting a pre-defined sensor composite service from a predetermined list.

As shown in FIG. 5, there are a plurality of primitive sensor services X1-Xk which may be used as a basis for providing the requested sensor composite service 510. These primitive sensor services X1-Xk may further have various sub-component primitive sensor services Y1-Ym that provide input to the primitive sensor services X1-Xk. The sub-component primitive sensor services Y1-Ym may have various sensor data sources 1-$n$ that provide input to the sub-component primitive sensor services Y1-Ym. Thus, a hierarchy of primitive sensor services and sensors is present from which the components and sub-components for generating a requested sensor composite service may be selected in accordance with the constraints specified in the request for the sensor composite service, e.g., cost constraints, geospatial region constraints, or the like.

In the depicted example, based on the components needed to provide the sensor composite service specified in the request 510, as determined either from being specifically specified in the request or automatically determined, various ones of the sensor data sources 1-$n$ and primitive sensor services X1-Xk, Y1-Ym are selected. The selection can take many different forms but are primarily based on the constraints specified in the request and the specific sensor composite service requested. For example, in one illustrative embodiment, the type of sensor composite service requested may be used to determine which primitive sensor services are required to provide the sensor composite service. In the depicted example, one or more of services X1-Xk are determined to be needed to provide the requested sensor composite service based on the type of services provided, which in this case may be services X1-X3.

In order to select a subset of the services X1-X3, spatial coverage characteristics associated with the services X1-X3 may be compared to the geospatial region of interest constraint specified in the request 510 to generate a spatial relevancy measure for the service X1-X3. In order to generate the spatial relevancy measure, the spatial coverage characteristics of the services X1-X3 must be determined. The services X1-X3 in this example do not have their own natively associated spatial coverage characteristic, e.g., a native range or radius. Therefore, a spatial coverage characteristic needs to be generated for the services X1-X3 based on the spatial coverage characteristics of their sub-components, e.g., services Y1-Ym. These services, in turn, may not have their own native spatial coverage characteristics and may have their spatial coverage characteristics generated based on the native spatial coverage characteristics of the sensor data sources 1-$n$ that provide input to the respective services Y1-Ym.

Thus, in the depicted example, service Y1 has a generated spatial coverage characteristic that is a function of the native spatial coverage characteristics of the sensor data sources 1 and 2. For example, the spatial coverage characteristic of service Y1 may be the intersection of the native spatial coverage characteristics of sensor data sources 1 and 2, e.g., spatial coverage (Y1)=Cov(1)^Cov(2), such as in the case of service Y1 being a triangulation service. Alternatively, other services may require different functions to be applied to the native spatial coverage characteristics of the sensor data sources 1 and 2 to generate the spatial coverage characteristic of the service, e.g., a union of the spatial coverage characteristics of the sensor data sources 1 and 2, such as in the case of a panoramic image composer service for example, or the like.

Thus, the service Y1 inherits the spatial coverage characteristics of the sensor data sources 1 and 2 through the application of a function to these spatial coverage characteristics, where the function may be specified in configuration information for the service Y1, to generate the spatial coverage characteristic for the service Y1. Similarly, service Y2 inherits the spatial coverage characteristics of the sensor data sources 4 and 5, although the function used to generate the spatial coverage characteristic for service Y2 may be different from that used to generate the spatial coverage characteristic for service Y1. In the same way, service Ym inherits the spatial coverage characteristic of sensor data source 6.

The same is true for higher levels of the hierarchy as well. That is, service X1 inherits the spatial coverage characteristics of service Y1 and sensor data source 3 by applying an appropriate function to these spatial coverage characteristics. Service X2 inherits from service Y2 and service X3 inherits from both services Y2 and Ym. In this way, components that do not have native spatial coverage characteristics have their spatial coverage characteristics generated based on their respective sub-components.

Having generated the spatial coverage characteristics for the various components and their sub-components, the spatial coverage characteristics may be compared to the geospatial region of interest specified in the request to generate a spatial relevancy measure for the particular components and/or sub-components. Based on the spatial relevancy measures associated with the components/sub-components, certain ones of the components/sub-components may be selected, e.g., those having a highest spatial relevancy measure. The selection of components/sub-components may further be constrained by the types of components/sub-components needed to provided the sensor composite service, e.g., a camera tracking service may require a triangulation service and a camera sensor service, which in turn may respectively need a plurality of acoustic sensors and one or more camera sensors. Additional operational constraints (such as may be expressed in the form of policies, for example) may also apply in conjunction with the spatial constraint specified by the geospatial region of interest in the original request for the sensor composite service, and which will further limit the selection of component sensors/services. In addition, the selection of components/sub-components may further be based on a cost of including the component/sub-component in the generation of the sensor composite service. The cost calculation may be based on a base cost associated with the component/sub-component which may itself be based on a number of characteristics of the component/sub-component, as described hereafter.

With regard to the spatial relevancy measure determination, various functions may be used to generate the spatial relevance measure depending on the particular implementation desired. In general, in accordance with one illustrative embodiment, the spatial relevancy measure SR may be calculated as a function of the overlapping area $D(C, c_x)$ between the geospatial region of interest C (with a radius R) and the spatial coverage characteristic $c_x$ of the component (with radius $r_x$), e.g., $SR=D(C, cx)/C$. Of course other functions can be used without departing from the spirit and scope of the illustrative embodiments. Components/sub-components having the highest spatial relevancy measures relative to the other components/sub-components may be selected, for example.

In addition to the spatial relevancy measure, a base cost may be calculated for each of the components/sub-components. The base cost may be generated in any suitable manner. One example way of calculating a base cost for a component is described in co-pending and commonly assigned U.S. patent application Ser. No. 13/029,156. This base cost may be based on various factors including restrictions on data flows, monetary costs charged by providers, interoperability of components, processing costs, network costs, or any of a plethora of other factors that provide a relative measure of the monetary costs and operational difficulty of using the component.

The spatial relevancy measure may be used either individually, or in combination with the base cost calculations, as a basis for generating a value for ranking the various components/sub-components relative to one another. For example, an overall cost for the inclusion of the component/sub-component may be calculated as a function of the combination of the spatial relevancy measure and the base cost. In one illustrative embodiment, this overall cost may be calculated as follows: $Cost=A*BaseCost_x+B*(1-SR_x)$, where Cost is the overall cost, A and B are predefined weights for the relative importance between the base cost ($BaseCost_x$) and Spatial Relevancy ($SR_x$) of component/sub-component x. In this case, the spatial relevancy measure is converted to an "irrelevancy" measure by converting it to a cost metric by subtracting the spatial relevancy measure from "1."

Ranked listings may be generated for each type of component/sub-component based on this overall cost metric. The ranked listings associated with the types of components/sub-components needed for generating the sensor composite service may be selected. Then, from these selected ranked listings, the number of components/sub-components needed for generating the sensor composite service may be selected based on the relative ranking, e.g., those having the lowest cost. The selected components/sub-components may be used to generate data structures and communication connections for establishing the requested sensor composite service. That is, after the component sensors/services are selected for inclusion in the sensor composite service, the information for these selected component sensors/services becomes part of the overall specification of the composite sensor service. Upon completion of the sensor composite service creation, i.e. once all component sensors/services have been selected and all their inputs are satisfied, then the specification itself is stored in a persistent storage medium to be used for instantiation, monitoring, reference/retrieval, etc. Instantiation may include transferring the code/execution specification of the component services on the sensor platform nodes on which they will be executed (if not already stored there), executing the component service code (e.g., activating the relevant modules in a container), configuring and activating the interconnections among the component services as specified in the overall sensor composite service specification, enabling monitoring capabilities for the component services, obtaining the output of the sensor composite service, evaluating relevant policies on the data as well as metadata, and other functionality that may be implemented in hardware or software executed on hardware platforms.

Thus, with the mechanisms of the illustrative embodiments, a sensor composite service may be generated based on the operational and spatial constraints specified in a request for the sensor composite service. The operational and spatial coverage characteristics of the components/sub-components, e.g., primitive sensor service, sensor, or the like, are considered when selecting components/sub-components for inclusion in the generation of the requested sensor composite service. In addition, for those components/sub-components that do not have a native spatial coverage characteristic, the mechanisms of the illustrative embodiments provide logic for generating a spatial coverage characteristic based on inherency principles, or any other mechanism for determining spatial characteristics based on the inputs to the components/sub-components. In this way, a sensor composite service may be dynamically generated in response to a user requested using deployed primitive sensor services and sensors.

Figure 6:
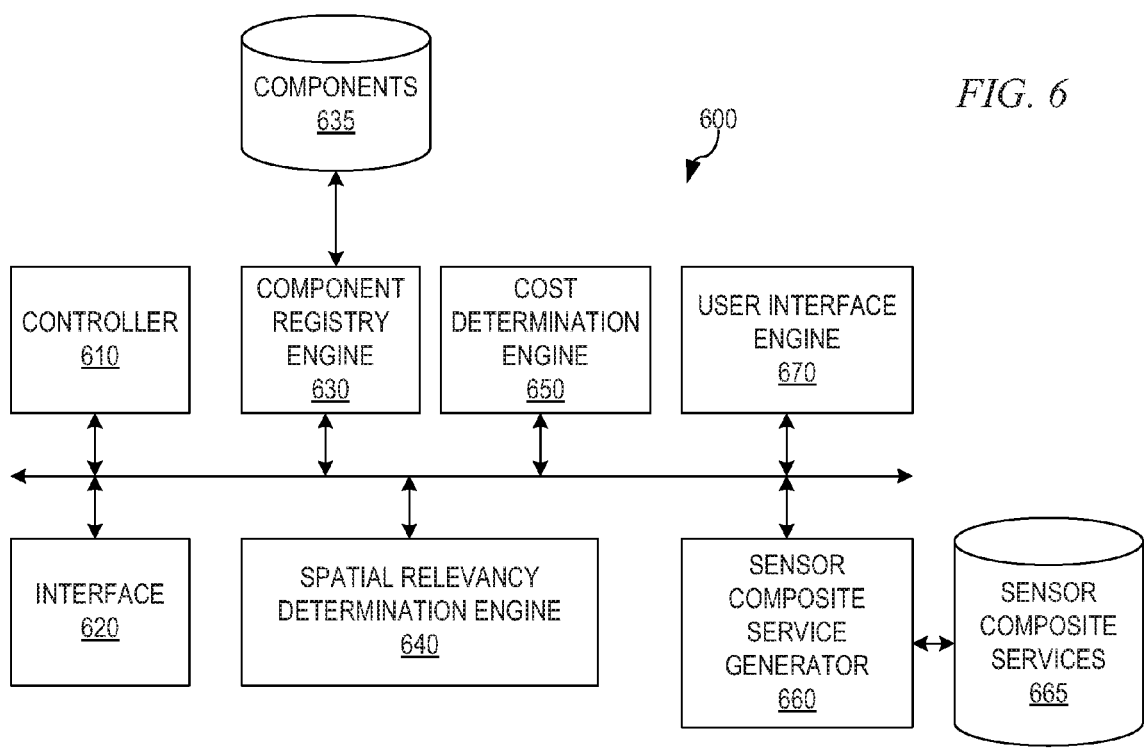
FIG. 6 is an example block diagram of a sensor composite service generation engine in accordance with one illustrative embodiment.

FIG. 6 is an example block diagram of a sensor composite service generation engine in accordance with one illustrative embodiment. As shown in FIG. 6, the sensor composite service generation engine 600 comprises a controller 610, an interface 620, a component registry engine 635 with corresponding component data storage 635, a spatial relevancy determination engine 640, a cost determination engine 650, a sensor composite service generator 660 and corresponding sensor composite services data structure 665, and a user interface engine 670. These elements may be implemented as logic in hardware, software, or any combination of hardware and/or software. In one illustrative embodiment, the elements of the sensor composite service generation engine 600 are implemented as software logic executed on one or more hardware devices. The sensor composite service generation engine 600 may be implemented in one or more of the computing devices in FIG. 1, for example, e.g., any one or more of the servers 104, 106 or client computing device 110-112.

The controller 610 controls the overall operation of the sensor composite service generation engine 600 and orchestrates the operation of the other elements 620-670. The interface 620 provides a control and data communication pathway through which data is sent/received by the sensor composite service generation engine 600. The interface 620 may be used to receive registration information from components/sub-components, receiving requests for sensor composite services, outputting information for defining or configuring the sensor composite service, and the like.

The component registry engine 630 provides the logic for receiving registration information from components/sub-components, either automatically or in response to requests sent from the component registry engine 630. The registration information gathered from the components/sub-components may comprise information about the types of data/services provided by the components/sub-components, base costs associated with the components/sub-components, configuration information, related sub-component identifiers, spatial coverage characteristics, or the like. Some components/sub-components may not include spatial coverage characteristics in which case the sensor composite service generation engine 600 generates a spatial coverage characteristic for the component/sub-component based on the inherency principles previously described above, or any other mechanism for determining spatial characteristics based on the inputs to the components/sub-components. The registration information gathered from the various components/sub-components is stored in the components data storage 635.

The spatial relevancy determination engine 640 provides logic for generating spatial coverage characteristics for components/sub-components that do not have natively associated spatial coverage characteristics, e.g., using an inherency function for calculating a spatial coverage characteristic based on the spatial coverage characteristics of components/sub-components providing input. Moreover, the spatial relevancy determination engine 640 further provides logic for calculating a spatial relevancy measure for components/sub-components in the components data storage 635 based on a geospatial region of interest in a request for the generation of a sensor composite service. For example, in one illustrative embodiment the spatial relevancy measure may be determined based on a function of the overlapping area between the geospatial region of interest and a spatial coverage characteristic of the component/sub-component.

The cost determination engine 650 comprises logic for calculating a cost for inclusion of particular components in the generation of a requested sensor composite service. The cost may be calculated in various ways but is generally a function of the spatial relevancy of the component/sub-component and a base cost associated with the component/sub-component. In one illustrative embodiment, the cost may be calculated as the function $Cost = A*BaseCost + B*(1-SR)$, for example.

The sensor composite service generator 660 provides logic for selecting components/sub-components based on the costs associated with the components/sub-components, the operational capabilities of the components/sub-components, such as the type of component/sub-component. The sensor composite service generator 660 further comprises logic for actually generating the sensor composite service based on the selection of the components/sub-components. Configuration information for defining the sensor composite service is stored in the sensor composite services data storage 665.

It should be appreciated that the actual generation of the sensor composite service may take place in multiple steps and guarantees that every component sensor service of the sensor composite service will receive input from other component/sub-component services and/or sensors. Once component sensors/services are selected, the wiring that connects an output of a component sensor/service to input of another component service is recorded as part of the specification. The composition process completes when no further component service selections are needed and all data inputs of a service are connected to sources for receiving data. One example algorithm for sensor service generation that may be augmented and extended to work with the mechanisms of the illustrative embodiment to generate a sensor composite service is described in Geyik et al., "Robust Dynamic Service Composition in Sensor Networks," IEEE Transactions on Services Computing, Oct. 16, 2012, volume pp, issue 99, which is incorporated herein by reference.

The user interface engine 670 provides logic for generating a user interface that is output to a user for defining a sensor composite service that is requested to be generated. The user interface may include, for example, fields for specifying the type of sensor composite service desired and the geospatial region of interest over which the sensor composite service operates. Additional fields may be provided for specifying components/sub-components to include in the sensor composite service, a quality of information for these components/sub-components, a budget for costs of components/sub-components, and/or other configuration parameters for defining the sensor composite service. Based on the request submitted through the user interface, the sensor composite service generation engine 600 may select which components/sub-components meet the operational and spatial constraints of the request.

In one illustrative embodiment, the user interface may include a predefined listing of the sensor composite services that may be generated which may in turn be used to identify predefined sets of components/sub-components associated with the sensor composite service. The particular instances of the components/sub-components that are selected are still dependent upon the spatial relevancy and costs, but the types of components/sub-components to include and even the number of each component/sub-component may be predefined with regard to predefined sensor composite services.

It should be appreciated that additional components for implementing the logic or functionality of the illustrative embodiments may be included in the sensor composite service generation engine 600 without departing from the spirit and scope of the present invention. Various ones of the elements in the sensor composite service generation engine 600 may be distributed to different computing devices or may be integrated with other elements of the sensor composite service generation engine 600 without departing from the spirit and scope of the present invention.

Figure 7:
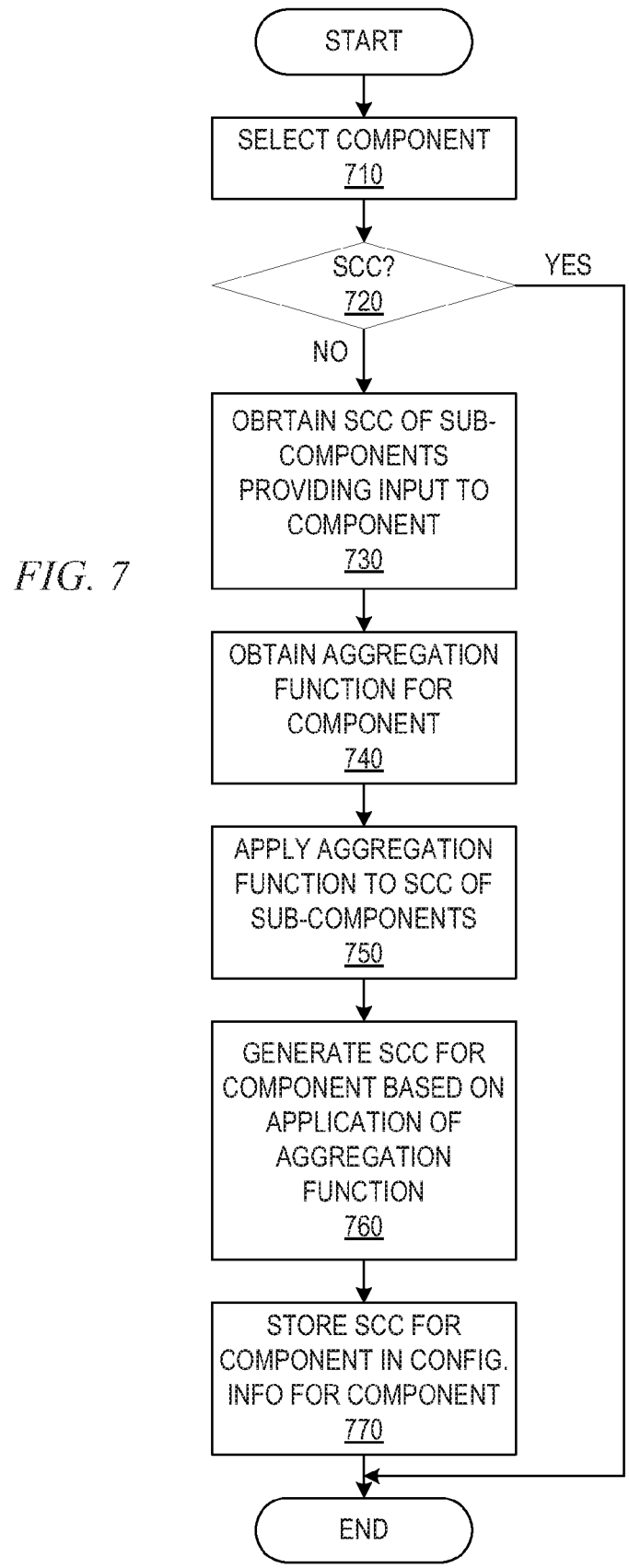
FIG. 7 is a flowchart outlining an example operation for generating a spatial coverage characteristic for a component in accordance with one illustrative embodiment.

FIG. 7 is a flowchart outlining an example operation for generating a spatial coverage characteristic for a component in accordance with one illustrative embodiment. The operation outlined in FIG. 7 may be implemented, for example, by the spatial relevancy determination engine 640 of the sensor composite service generation engine 600, for example.

The operation starts by selecting a component for determining a spatial coverage characteristic of the component (step 710). A determination is made as to whether the component comprises an already generated spatial coverage characteristic (SCC) or a native spatial coverage characteristic, e.g., a location and range or area of operation (step 720). If the component comprises an already generated spatial coverage characteristic or a native spatial coverage characteristic, the operation terminates. If the component does not comprise an already generated spatial coverage characteristic or a native spatial coverage characteristic, the spatial coverage characteristics of sub-components providing input to the component are identified (step 730). An aggregation function for generating the spatial coverage characteristic for the component is identified, such as from configuration information for the component (step 740) and applied to the spatial coverage characteristics of the sub-components (step 750) to generate a spatial coverage characteristic for the component (step 760). The spatial coverage characteristic that is generated for the component is then stored in configuration information for the component (step 770) and the operation terminates.

Figure 8A:
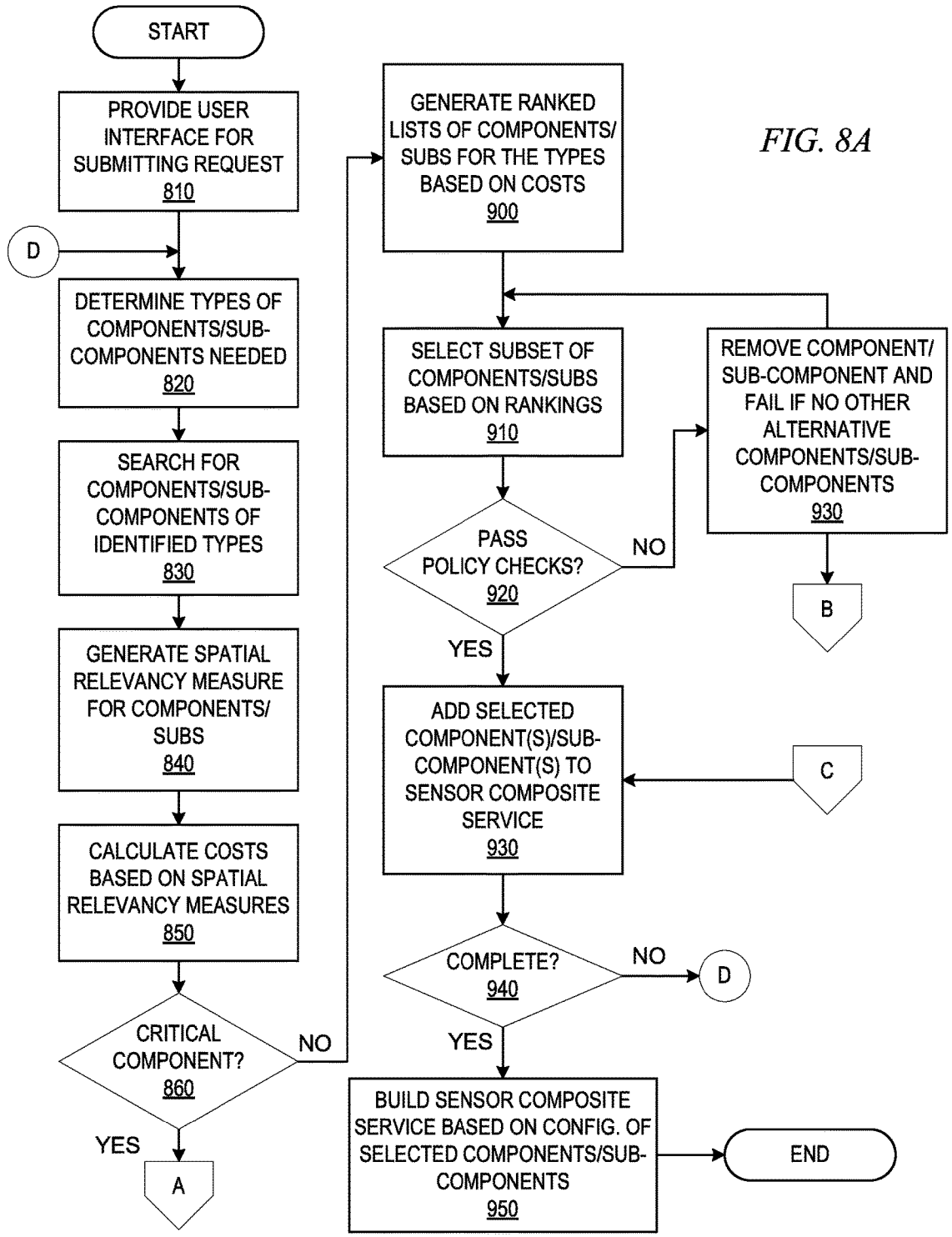
FIGS. 8A-8B illustrate a flowchart outlining an example operation for generating a sensor composite service based on cost, spatial relevancy, criticality of components, and policy checks, in accordance with one illustrative embodiment.
Figure 8B:
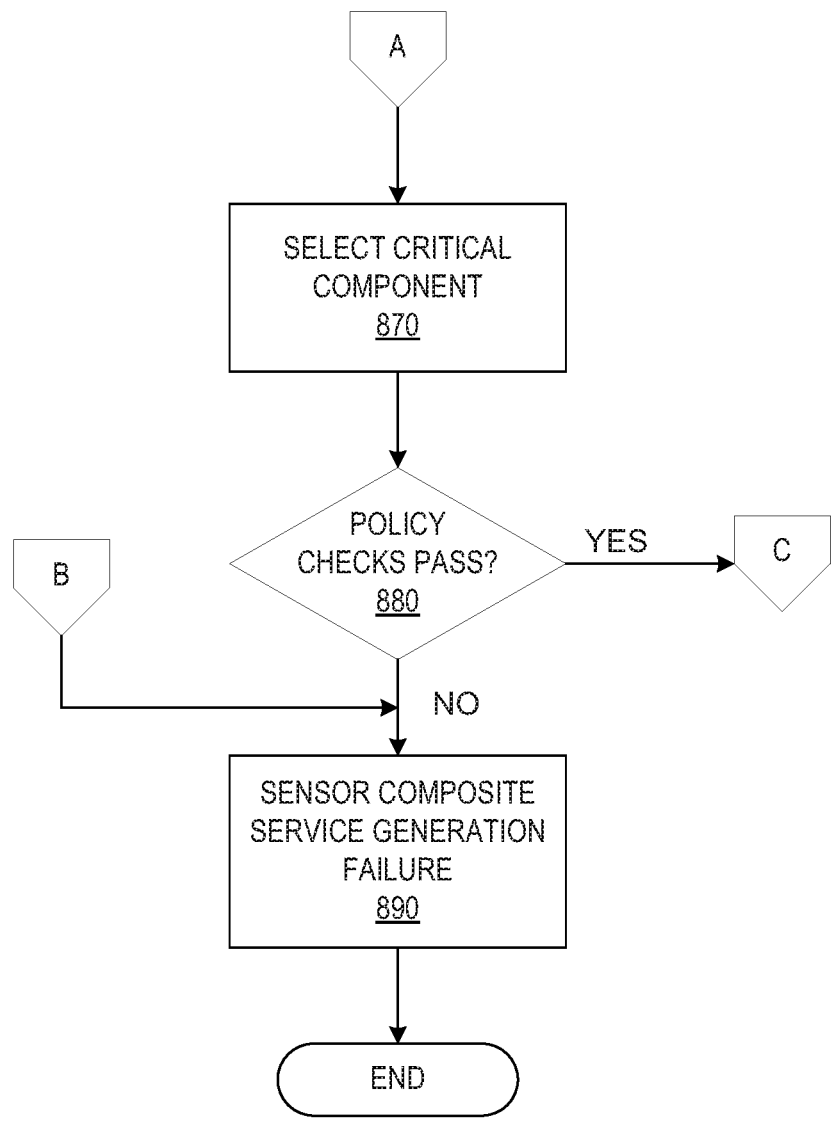

FIGS. 8A-8B illustrate a flowchart outlining an example operation for generating a sensor composite service based on cost, spatial relevancy, criticality of components, and policy checks, in accordance with one illustrative embodiment. The operation outlined in FIGS. 8A-8B may be implemented by the sensor composite service generation engine 600 in FIG. 6, for example. Various ones of the elements in the sensor composite service generation engine 600 may be used to implement various ones of the functions described in FIG. 8A-8B.

As shown in FIGS. 8A-8B, the operation starts by providing a user interface through which a user defines and requests a sensor composite service that the user wishes to have generated as well as constraints for the sensor composite service including operational and geospatial region of interest constraints (step 810). Types of components and sub-components needed to provide the requested sensor composite service are determined (step 820). As mentioned previously, this may be done by performing a lookup operation of predetermined sensor composite services in a database which identifies which components and sub-components are needed to provide the predetermined sensor composite services. Alternatively, components and sub-components may be specified in the original request for the sensor composite service. Moreover, a combination of predetermined sensor composite services and specified components in the request may be used in some implementations.

Based on the determined required components/sub-components for providing the requested sensor composite service, a search of the components/sub-components matching those types of components/sub-components in a component data storage is performed to identify matching sets of components/sub-components (step 830). For each matching component/sub-component, the spatial coverage characteristic of the component is compared to the geospatial region of interest constraint to determine a spatial relevancy measure for the component/sub-component (step 840). For each matching component/sub-component, the spatial relevancy measure is used as a basis for calculating a cost for including the component/sub-component in the sensor composite service (step 850). As discussed previously, the cost may further be a function of the base cost for the component, predetermined weight values, etc. The base cost may be determined from a combination of factors including processing costs, network costs, data flow restrictions, and the like.

For each type of matching component/sub-component, a determination is made as to whether that type of component/sub-component is a critical component/sub-component (step 860), where a "critical" component/sub-component is one that is needed to provide the sensor composite service and is only provided by a single instance of the component/sub-component. If a component/sub-component is critical, it must be selected for inclusion in the definition of the sensor composite service (step 870) since there are no other instances of the component/sub-component from which to choose, or other alternative sources of the required data. However, the critical component must still pass policy checks to ensure that the critical component still meets the requirements of the various governing policies with regard to access, authorization, and operational constraints (step 880). If any of the critical components do not meet the requirements of the governing policies, then the generation of the sensor composite service fails (step 890) and the operation terminates. If the critical components pass the policy checks, then the operation continues to step 930 described hereafter.

In a sense, one can view the selection of the components/sub-components for inclusion in the sensor composite service to be done both with regard to utility constraints and hard policy constraints. The utility constraints are measured in terms of base and spatial costs whereas the hard policy constraints are specified through access, authorization, and operational policies. For example, if a component/sub-component violates a policy constraint, then it will not be selected for inclusion in the sensor composite service even though the component might exhibit the best spatial characteristics and cost of the candidate components/sub-components.

For those components/sub-component types that are not critical, a ranked listings of components/sub-component instances, for each matching type of components/sub-components, are generated based on the calculated costs (step 900). Particular ones of the components/sub-components are selected from the ranked listings based on the rankings and the required number of each type of component/sub-component (step 910). For example, if three acoustic sensors are needed, then the three least costly acoustic sensors from the ranked listing of acoustic sensors may be selected. The selected components/sub-components may be subjected to policy checks (step 920) to ensure that the selected components/sub-components pass all applicable access, authorization, and operational policies. If any of the policies are not satisfied by the component/sub-component, the component/sub-component is removed from consideration and if there are no other alternatives for this type of component/sub-component, the generation of the sensor composite service fails (step 890). If there are other alternatives, the operation returns to step 910. If the components/sub-components pass all of the policy checks, the components/sub-components are added to the definition of the sensor composite service (step 930) and a determination is made as to whether all of the required components/sub-components to define the sensor composite service have been selected (step 940). If not, the operation returns to step 820. If so, the configuration information for the selected components/sub-components is used to build a sensor composite service configuration data structure and establish communication connections and data structures for the selected components/sub-components to establish the requested sensor composite service (step 950). The operation then terminates.

Thus, again, the illustrative embodiments provide a mechanism by which a sensor composite service may be dynamically generated based on specified operational and geo spatial constraints. As a result, more complex analysis and functionality is able to be dynamically generated for a region of interest by building the sensor composite service from primitive sensor services and corresponding sensors of the same or various types.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for generating a composite sensor service, the method comprising:
   receiving, by the data processing system, a request to generate the composite sensor service, wherein the request identifies a geospatial region of interest for the composite sensor service, and wherein the composite sensor service provides a composite functionality that combines different functions of a selected subset of component sensor services of different types;
   determining, by the data processing system, a plurality of types of component sensor services needed to generate the composite sensor service based on the request, wherein each type of component sensor service provides a different function of the composite functionality of the composite sensor service;
   selecting, by the data processing system, the subset of component sensor services, having a type of component sensor service needed to generate the composite sensor service, from a plurality of component sensor services, based on spatial coverage characteristics associated with each component sensor service in the plurality of component sensor services and types of each of the component sensor services in the plurality of component sensor services, wherein the spatial coverage characteristics of the component sensor services define a geographic region about which a corresponding component sensor service generates data; and
   generating the composite sensor service based on the selected subset of component sensor services, wherein generating the composite sensor service comprises establishing communication connections between the subset of component sensor services and configuring the subset of component sensor services to operate as part of the composite sensor service.

2. The method of claim 1, wherein each component sensor service in the subset of component sensor services comprises at least one sensor providing sensor data for processing, and at least one primitive sensor service that processes the sensor data provided by the at least one sensor.

3. The method of claim 1, wherein selecting the subset of component sensor services comprises:
   calculating, for each component sensor service in the plurality of component sensor services, a spatial relevancy measure based on a comparison of the geospatial region of interest and a corresponding spatial coverage characteristic of the component sensor service; and
   selecting the subset of component sensor services based on the spatial relevancy measures associated with each of the component sensor services in the plurality of component sensor services.

4. The method of claim 3, wherein selecting the subset of component sensor services comprises selecting component sensor services, in the plurality of component sensor services, that have a highest value spatial relevancy measure for inclusion in the subset of component sensor services.

5. The method of claim 1, wherein selecting the subset of component sensor services comprises:
   determining, for each component sensor service in the plurality of component sensor service, whether the component sensor service is a critical component sensor service, wherein a component sensor service is a critical component sensor service if the component sensor service is the only component sensor service in the plurality of component sensor services of it's component sensor service type; and
   automatically selecting, for inclusion in the subset of component sensor services, component sensor services in the plurality of component sensor services that are determined to be critical component sensor services, regardless of their spatial coverage characteristics.

6. The method of claim 1, further comprising:
   performing one or more policy check operations to apply one or more policies specifying at least one of access, authorization, or operational constraints for component sensor services in the subset of component sensor services; and
   determining if one or more of the component sensor services in the subset of component sensor services do not satisfy a constraint specified in the one or more policies based on results of the one or more policy check operations, wherein the composite sensor service is generated in response to all of the one or more policy check operations returning results that all of the constraints of the one or more policies have been satisfied by the component sensor services in the subset of component sensor services.

7. The method of claim 1, wherein selecting the subset of component sensor services further comprises selecting the subset of component sensor services based on types of the component sensor services in the plurality of component sensor services compared to the types of component sensor services needed to generate the composite sensor service, costs associated with inclusion of each component sensor service in the plurality of component sensor services in the subset of component sensor service, data flow constraints associated with each of the component sensor services of the plurality of component sensor services, and quality of information generated by the component sensor services of the plurality of component sensor services.

8. The method of claim 1, further comprising determining, for each component sensor services of the plurality of component sensor services, a corresponding spatial coverage characteristic at least by:
  determining whether the component sensor service has an already assigned spatial coverage characteristic; and
  in response to the component sensor service not having an already assigned spatial coverage characteristic, generating a spatial coverage characteristic for the component sensor service based on a spatial coverage characteristic of an other component sensor service in the plurality of component sensor services.

9. The method of claim 8, wherein generating the spatial coverage characteristic for the component sensor service based on a spatial coverage characteristic of the other component sensor service comprises:
  identifying the other component sensor service as a component sensor service providing an input into the component sensor service; and
  generating the spatial coverage characteristic of the component sensor service using an inherency function based on the spatial characteristic of the other component sensor service.

10. The method of claim 1, wherein the subset of component sensor services comprises at least one environmental sensor that detects an event in a physical environment, a location sensor service that determines a location of the event based on input from the at least one environmental sensor, and a higher level service that processes input from the location sensor service identifying the location of the event and performs an action based on the determined location of the event.

11. A computer program product comprising a non-transitory computer readable storage medium having a computer readable program stored therein, wherein the computer readable program, when executed on a data processing system, causes the data processing system to:
  receive a request to generate the composite sensor service, wherein the request identifies a geospatial region of interest for the composite sensor service, and wherein the composite sensor service provides a composite functionality that combines different functions of a selected subset of component sensor services of different types;
  determine a plurality of types of component sensor services needed to generate the composite sensor service based on the request, wherein each type of component sensor service provides a different function of the composite functionality of the composite sensor service;
  select the subset of component sensor services, having a type of component sensor service needed to generate the composite sensor service, from a plurality of component sensor services, based on spatial coverage characteristics associated with each component sensor service in the plurality of component sensor services and types of each of the component sensor services in the plurality of component sensor services, wherein the spatial coverage characteristics of the component sensor services define a geographic region about which a corresponding component sensor service generates data; and
  generate the composite sensor service based on the selected subset of component sensor services, wherein generating the composite sensor service comprises establishing communication connections between the subset of component sensor services and configuring the subset of component sensor services to operate as part of the composite sensor service.

12. The computer program product of claim 11, wherein each component sensor service in the subset of component sensor services comprises at least one sensor providing sensor data for processing, and at least one primitive sensor service that processes the sensor data provided by the at least one sensor.

13. The computer program product of claim 11, wherein the computer readable program further causes the data processing system to select the subset of component sensor services at least by:
  calculating, for each component sensor service in the plurality of component sensor services, a spatial relevancy measure based on a comparison of the geospatial region of interest and a corresponding spatial coverage characteristic of the component sensor service; and
  selecting the subset of component sensor services based on the spatial relevancy measures associated with each of the component sensor services in the plurality of component sensor services.

14. The computer program product of claim 13, wherein the computer readable program further causes the data processing system to select the subset of component sensor services at least by selecting component sensor services, in the plurality of component sensor services, that have a highest value spatial relevancy measure for inclusion in the subset of component sensor services.

15. The computer program product of claim 11, wherein the computer readable program further causes the data processing system to select the subset of component sensor services at least by:
  determining, for each component sensor service in the plurality of component sensor service, whether the component sensor service is a critical component sensor service, wherein a component sensor service is a critical component sensor service if the component sensor service is the only component sensor service in the plurality of component sensor services of it's component sensor service type; and
  automatically selecting, for inclusion in the subset of component sensor services, component sensor services in the plurality of component sensor services that are determined to be critical component sensor services, regardless of their spatial coverage characteristics.

16. The computer program product of claim 11, wherein the computer readable program further causes the data processing system to:
  perform one or more policy check operations to apply one or more policies specifying at least one of access, authorization, or operational constraints for component sensor services in the subset of component sensor services; and determine if one or more of the component sensor services in the subset of component sensor services do not satisfy a constraint specified in the one or more policies based on results of the one or more policy check operations, wherein the composite sensor service is generated in response to all of the one or more policy check operations returning results that all of the constraints of the one or more policies have been satisfied by the component sensor services in the subset of component sensor services.

17. The computer program product of claim 11, wherein the computer readable program further causes the data processing system to select the subset of component sensor services at least by selecting the subset of component sensor services based on types of the component sensor services in the plurality of component sensor services compared to the types of component sensor services needed to generate the composite sensor service, costs associated with inclusion of each component sensor service in the plurality of component sensor services in the subset of component sensor service, data flow constraints associated with each of the component sensor services of the plurality of component sensor services, and quality of information generated by the component sensor services of the plurality of component sensor services.

18. The computer program product of claim 11, wherein the computer readable program further causes the data processing system to determine, for each component sensor services of the plurality of component sensor services, a corresponding spatial coverage characteristic at least by:

determining whether the component sensor service has an already assigned spatial coverage characteristic; and in response to the component sensor service not having an already assigned spatial coverage characteristic, generating a spatial coverage characteristic for the component sensor service based on a spatial coverage characteristic of an other component sensor service in the plurality of component sensor services.

19. The computer program product of claim 18, wherein the computer readable program further causes the data processing system to generate the spatial coverage characteristic for the component sensor service based on a spatial coverage characteristic of the other component sensor service at least by:

identifying the other component sensor service as a component sensor service providing an input into the component sensor service; and generating the spatial coverage characteristic of the component sensor service using an inherency function based on the spatial characteristic of the other component sensor service.

20. An apparatus comprising:

a processor; and a memory coupled to the processor, wherein the memory comprises instructions which, when executed by the processor, cause the processor to:

receive a request to generate the composite sensor service, wherein the request identifies a geospatial region of interest for the composite sensor service, and wherein the composite sensor service provides a composite functionality that combines different functions of a selected subset of component sensor services of different types;

determine a plurality of types of component sensor services needed to generate the composite sensor service based on the request, wherein each type of component sensor service provides a different function of the composite functionality of the composite sensor service;

select the subset of component sensor services, having a type of component sensor service needed to generate the composite sensor service, from a plurality of component sensor services, based on spatial coverage characteristics associated with each component sensor service in the plurality of component sensor services and types of each of the component sensor services in the plurality of component sensor services, wherein the spatial coverage characteristics of the component sensor services define a geographic region about which a corresponding component sensor service generates data; and generate the composite sensor service based on the selected subset of component sensor services, wherein generating the composite sensor service comprises establishing communication connections between the subset of component sensor services and configuring the subset of component sensor services to operate as part of the composite sensor service.

* * * * *